United States Patent [19]

Smith

[11] Patent Number: 4,878,046

[45] Date of Patent: Oct. 31, 1989

[54] MOUNTING A CATHODE RAY TUBE FOR A HEADS-UP DISPLAY SYSTEM

[75] Inventor: Stephen J. Smith, Simsbury, Conn.

[73] Assignee: United Technologies Corporation, Hartford, Conn.

[21] Appl. No.: 79,553

[22] Filed: Jul. 30, 1987

[51] Int. Cl.⁴ .......................................... G02D 27/14
[52] U.S. Cl. .................................. 340/705; 340/980; 350/174
[58] Field of Search ............... 340/705, 980; 358/103, 358/104, 109; 350/174

[56] References Cited

U.S. PATENT DOCUMENTS

| | | | |
|---|---|---|---|
| Re. 28,847 | 6/1976 | Vizenor | 350/174 |
| 3,170,979 | 4/1962 | Baldwin et al. | 340/980 |
| 3,291,906 | 12/1966 | Ward et al. | 350/174 |
| 3,614,314 | 10/1971 | Rossire | 350/174 |
| 3,712,714 | 1/1973 | Uyeda et al. | 340/705 |
| 3,923,370 | 12/1975 | Mostrom | 350/174 |
| 4,028,725 | 6/1977 | Lewis | 358/109 |
| 4,220,400 | 9/1980 | Vizenor | 350/174 |
| 4,439,755 | 3/1984 | LaRussa | 340/705 |
| 4,636,866 | 1/1987 | Hattori | 340/705 |
| 4,722,601 | 2/1988 | McFarlane | 340/705 |
| 4,735,473 | 4/1988 | Migozzi et al. | 350/174 |
| 4,743,200 | 5/1988 | Welch et al. | 340/705 |

OTHER PUBLICATIONS

Lewis et al; "A High Resolution Vision System for Aircraft and Trainers", Conference Proceedings of the IEEE National Aerospace; May/76; pp. 894–902.

Primary Examiner—David K. Moore
Assistant Examiner—M. Fatahiyar
Attorney, Agent, or Firm—Francis J. Maguire, Jr.

[57] ABSTRACT

A method and apparatus for a helmet mounted display with a cathode ray tube for mounting on the torso of the operator are disclosed. A disconnectable cable supplies an information bearing signal to a signal conditioning circuit for mounting on the torso of the operator and a low voltage signal to a high voltage supply also for mounting on the torso of the operator. The high voltage supply provides the necessary high voltage for the operation of the cathode ray tube. The signal conditioning circuit provides the horizontal and vertical deflection signals and a decoded and amplified information bearing signal to the cathode ray tube. The cathode ray tube converts the information bearing signal into CRT images. A reducer, adjacent to and facing the cathode ray tube display face, reduces these CRT images and presents them to an optical fiber bundle which in turn presents the reduced CRT images to an expander. The expander then enlarges the reduced CRT images into enlarged CRT images and presents the enlarged CRT images to the display optics in the helmet.

3 Claims, 6 Drawing Sheets

MOUNTING A CATHODE RAY TUBE FOR A HEADS-UP DISPLAY SYSTEM

TECHNICAL FIELD

The invention relates to a helmet mounted display, more specifically to a cathode ray tube (CRT) which generates images for the helmet mounted display.

BACKGROUND ART

The piloting of an aircraft or helicopter is recognized as an extremely complex task because the aircraft or helicopter moves with six degrees of freedom, three degrees of translational freedom and three degrees of rotational freedom. To aid in this flying, projection displays were developed to display images, usually of the aircraft's instrument data, superposed against the scene of the real world (the environment). The first generation projection displays, also known as heads-up displays, consisted of a cathode ray tube with the appropriate optical elements mounted in the aircraft's instrument panel. The cathode ray tube generated an image which was reflected by a beam-splitter onto a combining mirror and then to the eyes of the pilot. Furthermore, through the appropriate selection of optical elements between the cathode ray tube and the combining mirror, the projected images on the combining mirror could be made to appear as if projected to optical infinity. This allowed the pilot to observe simultaneously both the aircraft's instrumentation and the real world scene.

In spite of the many obvious advantages, the first generation of projection displays had two major problems. First, the displayed information was stationary around an axis and was usually aligned along the longitudinal axis of the aircraft. Second, in any future aircraft design, large amounts of scarce instrumental panel space would be required for the large and bulky cathode ray tubes.

In an attempt to overcome the above mentioned problems, a second generation of projection displays, known as helmet mounted display, was developed. These second generation projection displays had the cathode ray tubes, the optics, and a high voltage cable mounted in the helmet. See U.S. Pat. No. 3,923,370, column 4, line 58 to column 5, line 42. The high voltage cable supplied the necessary voltage for the operation of the cathode ray tubes, but also had the potential for sparking during emergency disconnects. The helmet mounted cathode ray tubes were also very small in size, operated at voltages that were less than optimal, and produced generally dim images with poor resolution to the display optics. The optics in the second generation helmet mounted displays were also changed drastically because the cathode ray tubes were moved into the helmet. The images were produced at various locations in the helmet and projected, through a series of optical steps, down to the eyes of the pilot. The cathode ray tubes projected an image onto a partially reflective mirror, then onto a totally reflective mirror, and then to a combining mirror mounted on the visor in the pilot's line of sight. See U.S. Pat. No. 3,923,370, column 5, lines 1–42; U.S. Pat. No. Re 28,847, column 3, lines 58–65, column 4, line 52 to column 5, line 3. Hence, the pilot would see both the instrumentation and the real world scene simultaneously.

While the second generation of projection displays solve the problems discussed in connection with the first generation projection displays, it did suffer from a number of its own significant problems mainly associated with safety. First, during emergency ejection situations where both smoke and fuel vapors were in the cockpit, the high voltage cable had a tendency to spark. Second, this design forced the pilot to carry a great deal of weight on his head which restricted head movement, contributed to fatigue, and, during evasive maneuvers, could cause neck injury. Third, the cathode ray tubes within the helmet produced severe heat buildup within the helmet which resulted in degraded pilot performance. Finally, the cathode ray tubes mounted within the helmet operated at a lower voltage for reliability purposes, but this also produced dimmer images.

In an attempt to provide a more efficient projection display design, a third generation of projection displays was developed in which the cathode ray tubes were removed from the helmet, removed from the instrument panel, and placed in a noncritical portion of the aircraft with an optical fiber bundle coupling the cathode ray tubes with the eyes of the pilot. See U.S. Pat. No. 4,439,755, line 3, lines 1–5. With the removal of the cathode ray tubes from the helmet, the high voltage cable to the helmet was also removed and replaced with an optical fiber bundle which went to the optics within the helmet. The optics within the helmet were also changed. The images were produced by the cathode ray tube and were transferred from the optical fiber bundle through two compound lenses and a mirror. The mirror reflected and focused the images onto a fiber optical bundle in the helmet which carried the images to the front of the helmet and caused the images to be incident on a second mirror. The second mirror reflected the images onto a collimating lens and then to a beam-splitter which allowed the pilot to view both the image at infinity and the real world scene. See U.S. Pat. No. 4,439,755, column 7, lines 40–58, column 8, line 64 to column 9, line 11.

Although a rather good design, severe problems plagued the third generation of helmet mounted displays. First, the long fiber optical cable running from the helmet to the cathode ray tubes produced an unacceptable loss of light intensity and resolution between the cable's input and output. Second, since the distance between the helmet and the cathode ray tube was rather long, the fiber optical cable was rather thick and inflexible. Finally, the fiber optical cable required repair or replacement after every emergency disconnect situation because dust would inevitably enter into the fiber optic junction and cause severe distortion of the images seen by the pilot.

To further trace the development of projection optics see U.S. Pat. Nos. 3,291,906; 3,787,109; 4,220,400; and 4,508,424.

DISCLOSURE OF THE INVENTION

An object of the present invention is to provide a safe helmet mounted display.

Another object of the present invention is to reduce the heat within the helmet thereby providing for a more comfortable and ergonomic design.

According to the present invention, a cathode ray tube is provided for mounting on the torso of an operator which provides images to a helmet having display optics. A disconnectable cable supplies an information bearing signal to a signal conditioning circuit for mounting on the torso of the operator and a low voltage signal to a high voltage supply also for mounting on the torso of the operator. The high voltage supply provides the necessary high voltage for the operation of the cathode ray tube and the torso mounted signal conditioning circuit provides the horizontal and vertical deflection signals and the decoded and amplified information bearing signal to the cathode ray tube. The cathode ray tube converts the information bearing signal into CRT images. A reducer, adjacent to and facing the cathode ray tube display face, reduces these CRT images and presents them to an optical fiber bundle which in turn presents the reduced CRT images to an expander. The expander enlarges the reduced CRT images into enlarged CRT images and presents the enlarged CRT images to the display optics in the helmet.

The present invention represents a sizeable and substantial improvement over previous helmet mounted designs because it greatly enhances safety. No longer does the helmet have a high voltage cable directly attached to it which could spark during an emergency disconnect or crimp and expose the cable after extended use; nor does the helmet have cathode ray tubes (CRTs) mounted directly within it which operate at lower than normal operating voltages and arcs when the normal operating voltage is applied; nor does the helmet have so much weight that it alone can cause neck injury during evasive maneuvers while also severly limiting head movement; nor does the helmet generate so much heat from the internal electronics (i.e., the CRTs and the final video amplifiers) that it alone contributes greatly to fatigue and reduces efficiency, and no longer are the CRT brightness and control knobs on the aircraft's display console. Rather, the present design has an optic fiber bundle attached to the helmet which transmits images, not high voltage, and the CRTs are designed for mounting on the torso. These CRTs are several sizes larger than the helmet mounted CRTs, operate at their normal operating voltage for peak efficiency, and do not arc like the helmet mounted CRTs would if operated at their peak efficiency voltage. Also, the present design has drastically reduced the weight of the helmet and reduced the internal heat by removing the CRTs from the helmet. Finally, the present invention saves precious space on thee aircraft's display console by moving the CRT brightness and control knobs onto, e.g., a torso pack. In essence, the present invention represents a safer, more comfortable, and, in general, a more ergonomic design than any in the prior art.

Furthermore, besides being a safer and more ergonomic design, the present invention has several other practical advantages. First, the present invention allows the final video amps and the CRTs to be physically close together which minimizes the parasitic capacitance in the cable between the two, which allows increasing the bandwidth and thus the image resolution. Second, the present invention allows the use of larger CRTs which translates into brighter images produced by these larger CRTs.

These and other objects, features and advantages of the present invention will become more apparent in light of the detailed description of a best mode embodiment thereof, as illustrated in the accompanying drawing.

BRIEF DESCRIPTION OF THE DRAWING

FIG. 7 is one embodiment of the present invention showing the top view with the cover on;

BEST MODE FOR CARRYING OUT THE INVENTION

Figure 1:
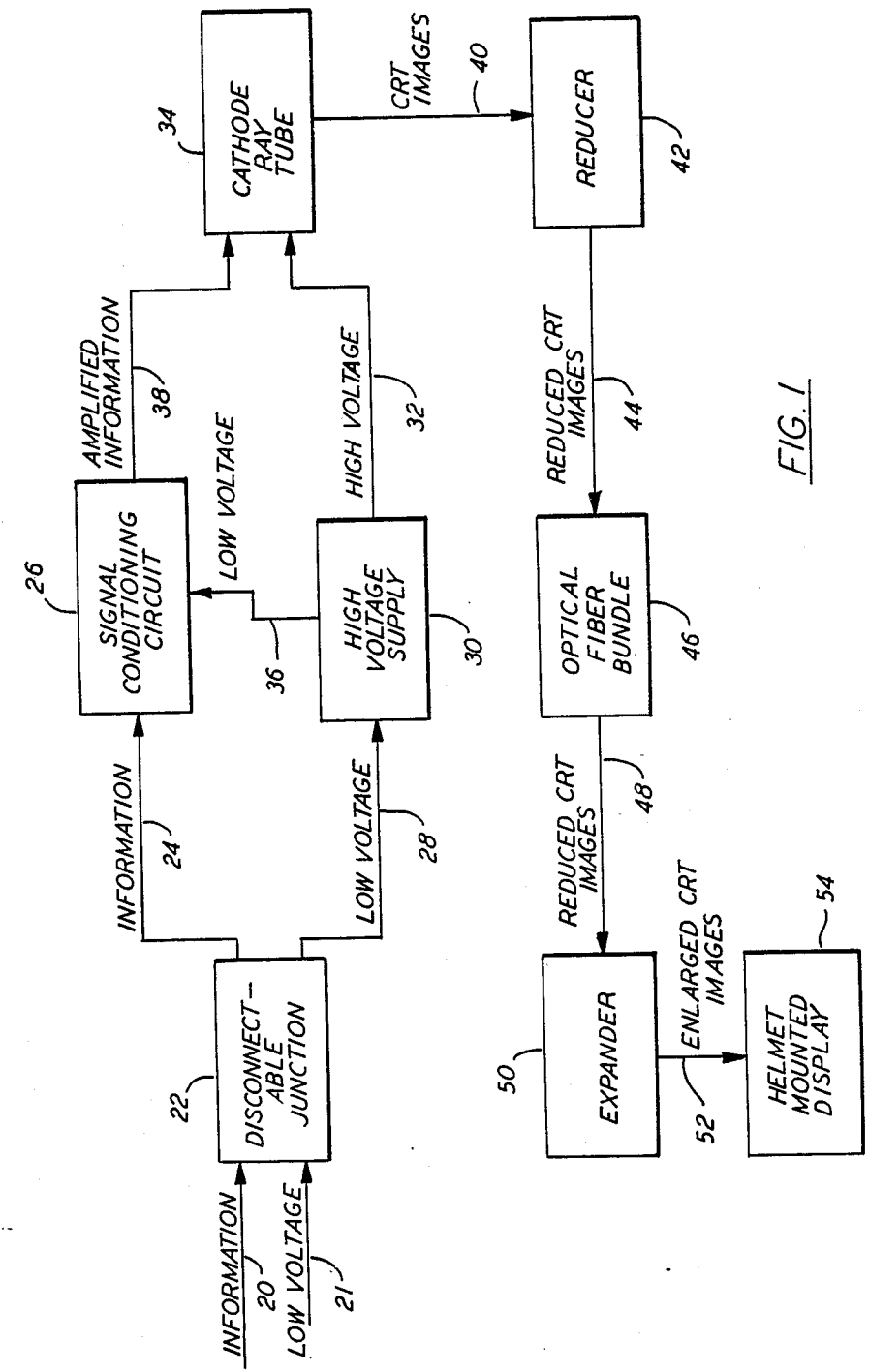
FIG. 1 is a block diagram representation of the present invention.

A helmet mounted display with a cathode ray tube is, in essence, a combination of electrical elements working in unison. These elements include: a low to high voltage converter which provides the necessary voltage for the cathode ray tube, a signal conditioning circuit which processes the incoming signals for the cathode ray tube, the cathode ray tube which transforms these incoming signals into images, optical fiber elements which transfer these images to the helmet, and helmet mounted display optics which allows the operator to view both the projected images and the scenes of the real world. FIG. 1 is a block diagram representation of a helmet mounted display with a cathode ray tube for torso mounting, according to the present invention. This diagram represents a general and broad overview of the context of the present invention. A mission computer prompts external sensors (not shown) to send an image related information signal on a line 20 and a voltage signal on a line 21 to a disconnectable junction 22. The disconnectable junction 22 is usually of a bayonet mount type which reduces sparking and is used in emergency situations where the operator must eject quickly. Upon receiving the information and voltage signals on the lines 20 and 21, the disconnectable junction 22 provides those signals as an information bearing signal on a line 24 to a signal conditioning circuit 26 and a low voltage signal on a line 28 to the high voltage supply 30. The high voltage supply 30 converts the low voltage signal received on the line 28 to a high voltage signal and provides this signal on a line 32 to a cathode ray tube 34. The high voltage supply 30 also supplies a low voltage signal on a line 36 to the signal conditioning circuit 26 which utilizes the information bearing signal on the line 24 and the low voltage signal on the line 36 to generate an amplified information bearing signal on a line 38 for the cathode ray tube 34. The image information bearing signal 20 contains information to display normal video images as seen by the external sensors (i.e., night vision, inclement weather vision, or low visibility vision) and/or alphanumeric characters and symbols used in the various operational modes (i.e., navigation, target acquisition or weapons systems). The cathode ray tube 34 converts the amplified information bearing signal on the line 38 into CRT images and sends these images through an optical signal interface 40 to a reducer 42. The reducer 42, which may typically be an optical or fiber optical device, reduces the size of the CRT images and sends the reduced CRT images through an optical signal interface 44 to an optical fiber bundle 46 which then transfers the reduced CRT images on an optical signal line 48 to the expander 50. The expander 50, also typically an optical or fiber optical device, enlarges the size of he previously reduced CRT images and provides the enlarged CRT images on an optical signal line 52 to a helmet mounted display 54. The helmet mounted display 54 allows the operator to view simultaneously both the enlarged CRT images projected onto a partially reflective combining mirror and the real world scenes (presented via direct transmission through the visor or by reflection).

As noted earlier in this discussion, the cathode ray tube, without limitation, can display either images, information, or both. The ability of the cathode ray tube to display both images and information is due to the signal conditioning circuit's ability to operate in either the "raster" or the "stroke" mode. In the "raster" mode which displays real world images, the signal conditioning circuit receives an information bearing signal 20 from the external sensors containing both sync signals for the CR's deflection circuitry and intensity signals for controlling the electron beam and hence the brightness of the picture element. Thus, the amplified information bearing signal contains the necessary information (i.e., horizontal and vertical sync signals and beam intensity information) to control the interlaced scanning sequence for the cathode ray tube and the electron beam intensity.

The "stroke" mode, which displays information, operates quite differently from the "raster" mode. In the "stroke" mode, a computer, usually a microprocessor or any other suitably programmed hardware, receives information 20 from a data bus via a mission computer and external inputs, usually external sensors both analog and discrete. The computer enables a symbol generating PROM which sends the proper deflection and blanking signals in the proper sequence to allow the electron beam to write the information onto the screen of the cathode ray tube. The electron beam in the "stroke" mode actually writes the information onto the screen of the cathode ray tube by moving the electron beams position around (i.e., the x and y deflection signals) while keeping the intensity of the electron beam constant, much in the same manner as a human writes with a pencil.

The cathode ray tube can also display both images and information simultaneously through the combined use of the "raster" and the "stroke" modes. To display both images and information, the electron beam completes one field in the "raster" mode and then the signal conditioning circuit enters the "stroke" mode before the vertical retrace takes place. In the "stroke" mode, the electron beam is slewed into the correct x and y position and begins writing the required information onto the screen of the cathode ray tube. Upon completing the writing of the information, the signal conditioning circuit re-enters the "raster" mode, the vertical retrace takes place, and the electron beam begins interlace scanning for another field. The ability of the electron beam to do alternating "raster" and "stroke" modes is due to the fact that the electron beam requires only 10 microseconds to do a vertical retrace, yet is given 1.2 milliseconds for a vertical retrace in the "raster" mode.

Figure 2:
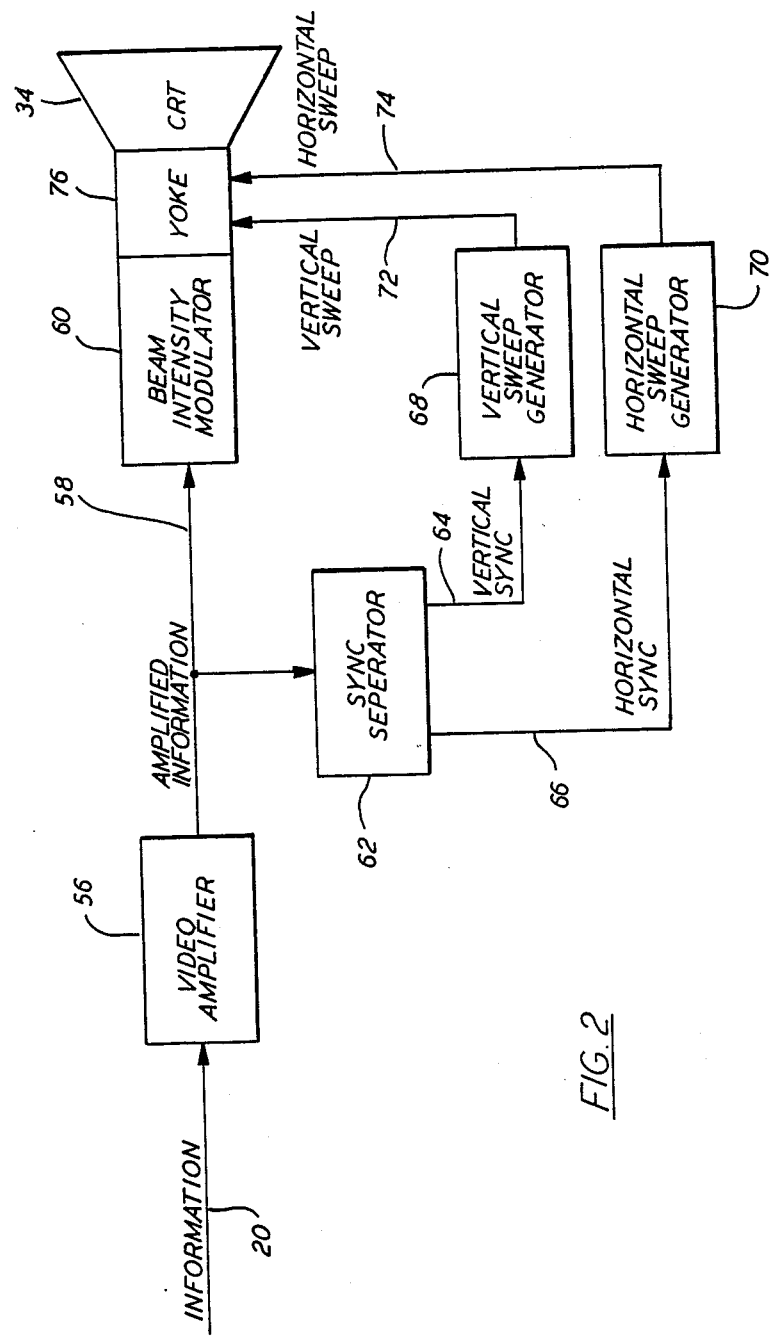
FIG. 2 is one embodiment of the section of the signal conditioning circuit used to generate images in the "raster" mode.

In the "raster" mode, external sensors convert real world scenes into an information bearing signal 20 which is sent to the section of the signal conditioning circuit used to generate images in the "raster" mode. FIG. 2 is one embodiment of the section of the torso mounted signal conditioning circuit used to generate images in the "raster" mode. The information bearing signal on the line 20 contains both information and control signals and is sent to a video amplifier 56. The video amplifier 56 amplifies the information bearing signal to a magnitude sufficient to drive the cathode ray tube over its modulation range. This amplified signal, called the amplified information bearing signal, is sent on a line 58 to both a beam intensity modulator 60 and to a sync separator 62. The sync separator 62 strips the horizontal and vertical timing signals from the amplified information bearing signal and sends these timing signals, called the vertical sync signal on a line 64 and the horizontal sync signal on a line 66, to a vertical sweep generator 68 and to a horizontal sweep generator 70, respectively. The vertical sweep generator 68 and the horizontal sweep generator 70 produce, respectively, a vertical sweep signal on a line 72 and a horizontal sweep signal on a line 74 which both go to a yoke 76 of the cathode ray tube 34. The horizontal and vertical sweep signals control the interlaced scanning sequence for the cathode ray tube while the amplified information bearing signal controls the intensity of the electron beam accelerating onto the cathode ray tube. Together all three signals-the vertical sweep signal on the line 72, the horizontal sweep signal on the line 74, and the amplified information bearing signal on the line 58-produce the raster type images on the screen of the cathode ray tube.

Figure 3:
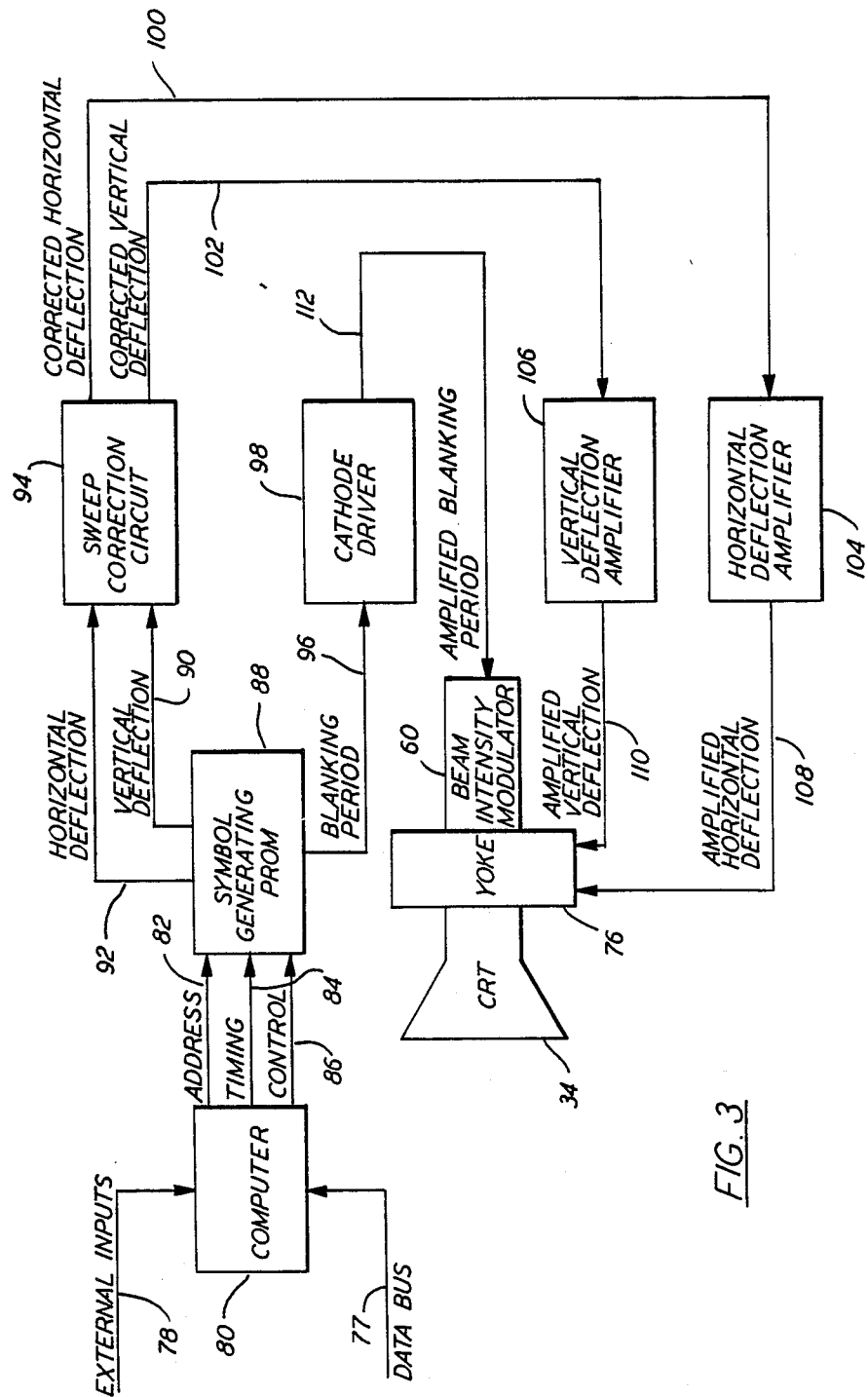
FIG. 3 is one embodiment of the section of the signal conditioning circuit used to generate alphanumeric characters and symbols in the "stroke" mode.

In the "stroke" mode, a mission computer sends an information bearing signal to the section of the torso mounted signal conditioning circuit used to generate alphanumeric characters and symbols in the "stroke" mode. FIG. 3 is one embodiment of a signal conditioning circuit used to generate alphanumeric characters and symbols in the "stroke" mode. The mission computer sends information on the data bus on a line 77 to a computer 80. The computer 80 both processes the information and samples selected external inputs (i.e. external sensors both digital and analog) on a line 78 to determine the format and content of the information to be displayed on the screen of the cathode ray tube 34. The computer 80 then sends the necessary addresses on a line 82, sends the proper timing sequence on a line 84, and sends the correct control signals on a line 86 to a symbol generating PROM 88. The symbol generating PROM 88 contains within its memory a map of all the alphanumeric characters and symbols along with the corresponding horizontal and vertical deflection signals and blanking period signals that the electron beam needs to generate each respective alphanumeric character or symbol. Upon accessing the proper address and receiving the proper timing and control signals for a respective alphanumeric character or symbol, the symbol generating PROM 88 provides both the corresponding vertical deflection signal on a line 90 and the corresponding horizontal deflection signal on a line 92 to a sweep correction circuit 94, and the corresponding blanking period signal on a line 96 to a cathode driver 98. Together, in the "stroke" mode, all three signals—the horizontal deflection signal on the line 92, the vertical deflection signal on the line 90, and the blanking period signal on the line 96—collectively make up the information bearing signal found on line 24 in FIG. 1. The sweep correction circuit 94 corrects the horizontal and vertical deflection signals to account for the anomalies, such as curvature, of the cathode ray tube face. The sweep correction circuit 94 sends a corrected horizontal deflection signal on a line 100 to a horizontal deflection amplifier 104 and a corrected vertical deflection signal on a line 102 to a vertical deflection amplifier 106. The horizontal deflection amplifier 104 and the vertical deflection amplifier 106 amplify their respective signals and send respectively an amplified vertical deflection signal on a line 110 and an amplified horizontal deflection signal on a line 108 to the yoke 76. The horizontal and vertical deflection signals are used to position the electron beam during the writing of the characters. As stated earlier in this discussion, the symbol generating PROM 88 also provides a blanking period signal on the line 96 to the cathode driver 98. The cathode driver 98 amplifies the blanking signal to a magnitude sufficient to drive the cathode ray tube for a sufficient period to allow the electron beam to write the specific character or symbol. Together all three signals—the amplified blanking period signal on the line 112, the amplified vertical deflection signal on the line 110, and the amplified horizontal deflection signal on the line 108—allow the electron beam to write characters onto the screen of the cathode ray tube, as mentioned above, in much in the same way as a person writes with a pencil.

It should be noted that FIGS. 2 and 3 represent functional descriptions of only the essential elements necessary to understand how the "stroke" and "raster" modes circuitry work. One skilled in the art will realize that obvious elements, such as octal transceivers, bus drivers, multiplexers, digital to analog converters, and timing and so on, have been omitted from FIG. 3 for the purpose of clarity. FIG. 2 has been similarly simplified. Furthermore, one skilled in the art will realize that FIGS. 2 and 3 represent but one of many methods for generating images and information onto the screen of the cathode ray tube with an electron beam. Therefore, the circuitry used in the "raster" and "stroke" modes should in no way be limited to those embodiments illustrated in FIGS. 2 and 3.

Once the electron beam generates images onto the screen of the cathode ray tube, the optical fiber elements 42, 46, 50 of FIG. 1 transfer these images to the helmet mounted display. As previously described, the optical fiber elements consist of a reducer 42 mounted adjacent to and facing the display face of the cathode ray tube, an enlarger 50 adjacent to and facing the display optics, and an optical fiber bundle 46 connecting the enlarger to the reducer. To minimize the distortion and loss, the three optical interfaces (i.e., cathode ray tube display—reducer, reducer 40—optical fiber bundle, and optical fiber bundle 44—expander 48) are joined with an optical epoxy, oil or jelly having the same or as close to the same index of refraction as the two optical devices. Should the two optical devices have different indexes of refraction, then the optical epoxy should have an index of refraction between the indexes of refraction of the two optical devices. Optical epoxy actually will bond the interfaces together while the optical oils and optical jellies will not. Hence, when using the optical jellies or optical oils, the optical interfaces will require external structural supports to keep the optical structures properly aligned.

Figure 4:
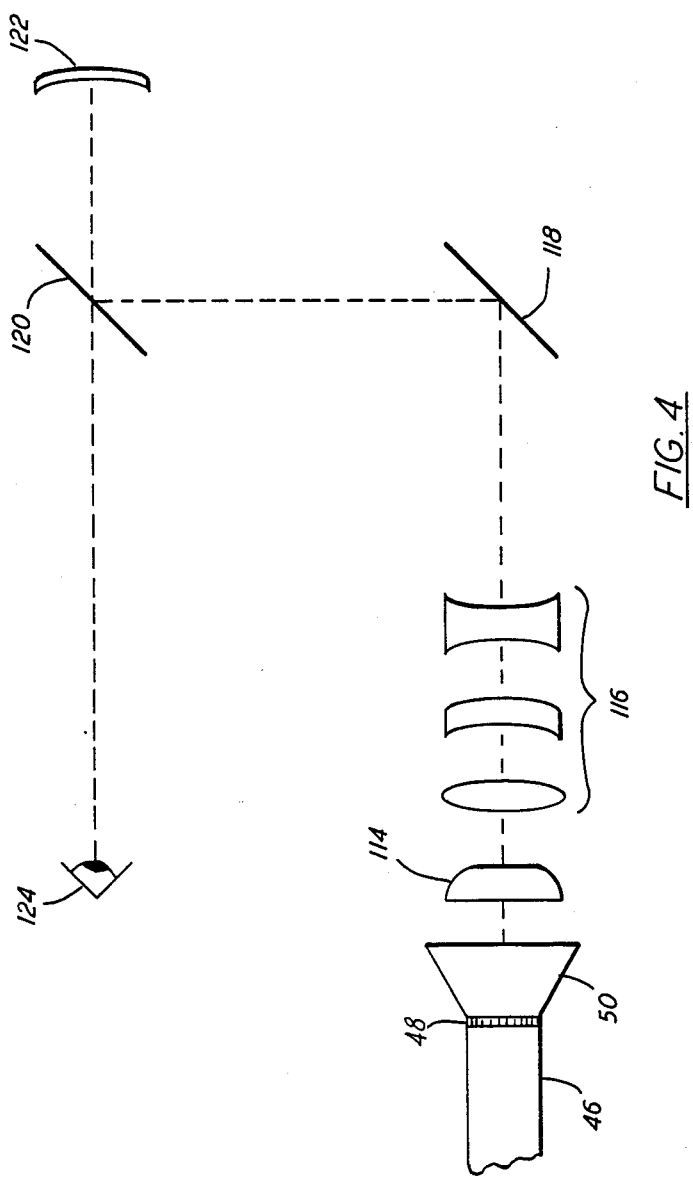
FIG. 4 is one embodiment of the optics within the helmet mounted display.

Once having been transmitted through the optical fiber elements, the reduced CRT images enter the optical system of the helmet mounted display. FIG. 4 is one embodiment of optics included within a helmet mounted display. The interface 48 fiber bundle 46 transfers the reduced CRT images through the optical to the expander 50. The expander 50 enlarges the CRT images and presents the enlarged CRT images to a combining mirror 114 which then presents the enlarged CRT images to a relay lens system 116. The relay lens system 116, which may be a single lens or a combination of lenses, adjusts the size of the enlarged CRT images and corrects the distortions created by the combining mirror 114. The corrected images are reflected from a planer mirror 118 and a beam-splitter 120 to a combining mirror 122. The combining mirror 122 collimates the corrected CRT images and sends these images to the eye of the observer 124 through mirror 120. The combining mirror 122 may be either planer or spherical and is a partially reflective device which allows viewing both reflected images and the transmitted outside real world scene.

Again as stated in earlier paragraphs, FIG. 4 represents only one embodiment of an optical system used in a helmet mounted display. One skilled in the art will know of many different optical systems which allow the viewing of reflected images and real world scenes simultaneously on the same combining surface. For example, the elements in FIG. 4 can be slightly modified by removing the relay lenses 116, replacing the planer mirror 118 with the combining mirror 114 and moving the optical fiber elements in line with the combining mirror 114 and the beam-splitter 120, yet the optical output of both systems will still remain the same. Therefore, the optical system of this invention should in no way be limited to only the one embodiment disclosed in FIG. 4.

The function description of each of the electrical elements within the helmet mounted display ends at this point and the actual layout for one embodiment of the invention begins.

Figure 5:
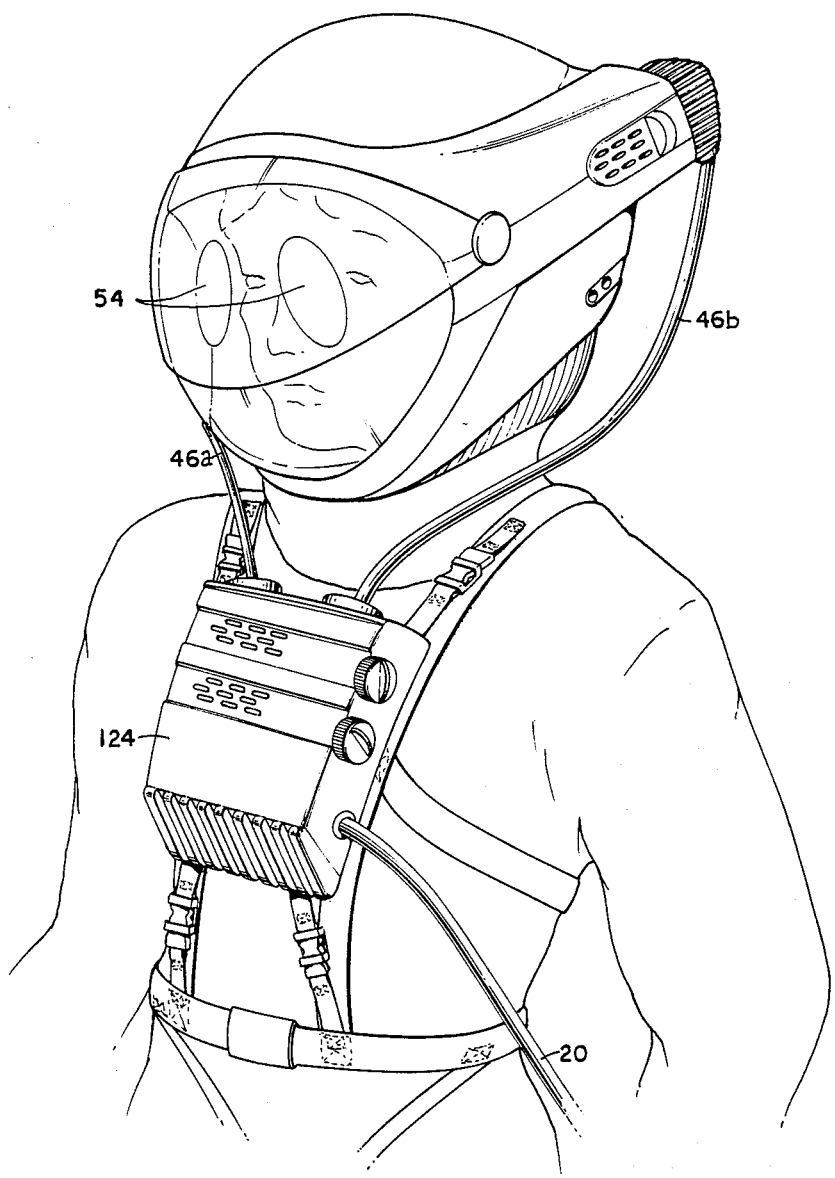
FIG. 5 is one embodiment of the present invention shown mounted on a human.

FIG. 5 is one embodiment of the present invention mounted on a human. FIG. 5 shows the line 20 which carries the information and voltage signal, a pack 124 for torso mounting, a pair of the optical fiber bundles 46, and the helmet mounted display 54.

Figure 6:
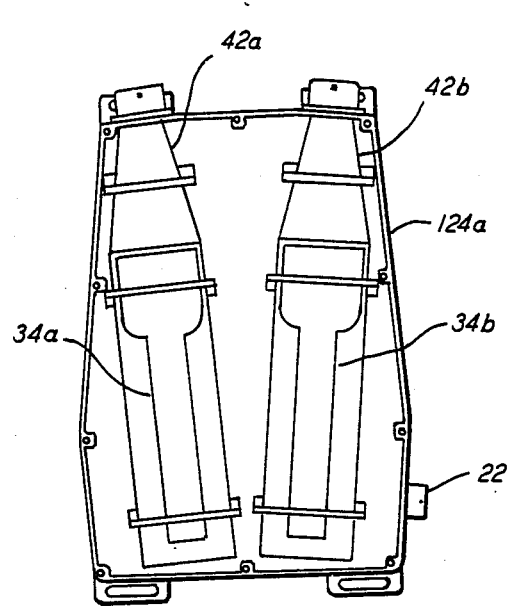
FIG. 6 is one embodiment of the present invention showing the front view with the cover removed.

FIG. 6 shows one embodiment of an apparatus 124a similar to the pack 124 of FIG. 5, according to the present invention, showing the front view with the cover removed. The pack 124a has within it two cathode ray tubes 34a, 34b, two reducers 42a, 42b, adjacent to and facing the cathode ray tube's display faces, and a disconnectable junction 22 for connection to the line 20 which carries the information and voltage signal.

Figure 7:
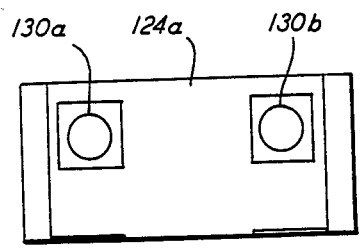

FIG. 7 shows the top view of the pack 124a with the cover on, having two optical fiber bundle support structures or connectors 130a, 130b for connection to fiber bundles 46a, 46b.

Figure 8:
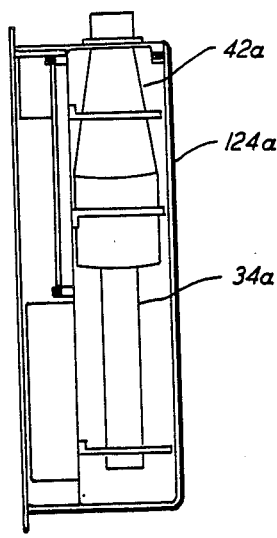
FIG. 8 is one embodiment of the present invention showing the side view with the cover removed.

FIG. 8 is same embodiment of the present invention showing the side view with the cover removed. This side view of the pack 124a shows the cathode ray tube 34a and the reducer 42a adjacent to and facing the cathode ray tube's display face.

Figure 9:
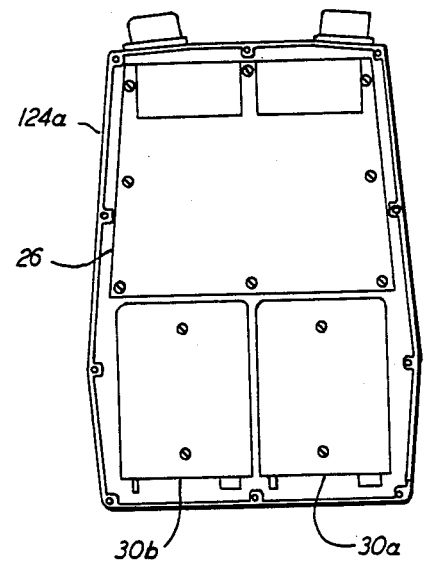
FIG. 9 is the same embodiment of the present invention showing the back view with the cover removed.

FIG. 9 is the same representation of the present invention showing the back view with the cover removed. The back view of the pack 124a shows both the signal conditioning circuit 26 and two high voltage power supplies 30a, 30b.

Although the present invention has been shown and described with respect to a best mode embodiment thereof, it should be understood by those skilled in the art that the foregoing and various other changes, omissions, and additions in the form and detail thereof may be made therein without departing from the spirit and scope of the invention.

I claim:

1. A helmet mounted display system for displaying, to the wearer of the helmet, electronically generated images in superposition with a view of the environment, comprising:

a helmet;

a pack adapted to be worn on the torso of the wearer of said helmet;

a cathode ray tube disposed in said pack;

a signal conditioning circuit means disposed in said pack for providing, in response to image related signals received thereat, image generation controlling signals to said cathode ray tube;

a high voltage supply means disposed in said pack for providing a high voltage signal to said cathode ray tube and for providing operating voltage to said signal conditioning circuit means;

connection means disposed on said pack for connecting said signal conditioning circuit means for response to image related signals provided externally of said pack and for connecting a voltage source external of said pack to said high voltage supply means;

optical fiber means extending between said pack and said helmet for conducting images presented on said cathode ray tube to said helmet; and a superposing display optics system disposed in said helmet in a manner to permit viewing of the environment therethrough by the wearer thereof and disposed with respect to said optical fiber means so as to superpose images presented by said cathode ray tube on the wearer's view of the environment.

2. A display system according to claim 1 wherein said optical fiber mans comprises an image size reducer, an optical fiber bundle, and an image sized expander, said reducer being disposed between said cathode ray tube and said bundle, said expander being disposed between said bundle and said display optics system.

3. A display system according to claim 1 wherein said high voltage supply mans comprises means for providing said high voltage signal at a voltage level which is significantly higher than the level of voltage supplied thereto from said source through said connection means.

* * * * *